United States Patent
Hasegawa

(10) Patent No.: US 12,061,942 B1
(45) Date of Patent: Aug. 13, 2024

(54) IMAGE FORMING APPARATUS AND IMAGE PROCESSING APPARATUS

(71) Applicant: Toshiba Tec Kabushiki Kaisha, Tokyo (JP)

(72) Inventor: Satoshi Hasegawa, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/468,664

(22) Filed: Sep. 15, 2023

(51) Int. Cl.
   *G06K 15/00* (2006.01)
   *G03G 15/00* (2006.01)
   *G06K 15/16* (2006.01)

(52) U.S. Cl.
   CPC ......... *G06K 15/408* (2013.01); *G03G 15/55* (2013.01); *G06K 15/16* (2013.01)

(58) Field of Classification Search
   CPC ......... G03G 15/0865; G03G 15/1615; G03G 15/602; G03G 15/6511; G03G 15/2028; G03G 2215/00945; B41J 11/0055; B41J 11/007; B41J 11/0095; B41J 11/663; B41J 11/706; B41J 13/0018; B41J 13/02; B41J 2/2132; B41J 29/393; B65H 2220/09;

(Continued)

(56) References Cited

U.S. PATENT DOCUMENTS

| 2015/0259162 A1* | 9/2015 | Osada ............... B65H 3/5207 271/157 |
| 2017/0274688 A1* | 9/2017 | Hatada .............. B65H 23/188 |
| 2020/0285184 A1* | 9/2020 | Hitaka ............. G03G 15/6529 |

(Continued)

FOREIGN PATENT DOCUMENTS

| JP | H5747 A | 1/1993 |
| JP | H05-132191 A | 5/1993 |
| JP | H11-100148 A | 4/1999 |

*Primary Examiner* — Negussie Worku
(74) *Attorney, Agent, or Firm* — FOLEY & LARDNER LLP

(57) ABSTRACT

An image forming apparatus includes a conveying unit, an image forming unit, a first detection unit, a second detection unit, and a control unit. The conveying unit includes a conveying member configured to convey a printing medium along a predetermined conveyance path. The image forming unit forms an image on the printing medium. The first detection unit detects passage of the printing medium through a first position on the conveyance path. The second detection unit detects passage of the printing medium through a second position that is positioned downstream of the first position on the conveyance path. The control unit controls the conveying unit and the image forming unit. If the control unit determines whether the conveying member is deteriorated, the control unit controls the conveying unit such that the printing medium is conveyed at a second conveying speed slower than a first conveying speed, the first conveying speed being a speed at which the printing medium is conveyed if the control unit does not determine whether the conveying member is deteriorated, and determines whether the conveying member is deteriorated based on a first timing at which the printing medium is detected by the first detection unit and a second timing at which the printing medium is detected by the second detection unit.

16 Claims, 7 Drawing Sheets

(58) Field of Classification Search
CPC .......... B65H 2301/331; B65H 2404/14; B65H 2511/24; B65H 2513/20; B65H 9/002
USPC ...................................................... 358/1.12
See application file for complete search history.

(56) References Cited

U.S. PATENT DOCUMENTS

2021/0061593 A1\* 3/2021 Tokuno ................ B65H 3/5215
2022/0260944 A1\* 8/2022 Endo ................... G03G 15/2064
2022/0317617 A1\* 10/2022 Sugimoto ............ B65H 3/0669

\* cited by examiner

IMAGE FORMING APPARATUS AND IMAGE PROCESSING APPARATUS

FIELD

Embodiments described herein relate generally to an image forming apparatus and an image processing apparatus.

BACKGROUND

In the related art, an image forming apparatus that conveys a printing medium using a plurality of rollers and forms an image on the conveyed printing medium is known. In the image forming apparatus, the plurality of rollers that convey the printing medium is worn out whenever the printing medium is conveyed. In the image forming apparatus, when determined to reach the end of the lifetime, the plurality of rollers are replaced by a user or a repair person. Therefore, in the image forming apparatus, whether the plurality of rollers reached the end of the lifetime is determined based on whether a value as an index representing the lifetime, for example, the number of times the printing medium is conveyed or a cumulative value of drive time of a motor that rotates the plurality of rollers, exceeds a predetermined threshold. However, recently, a printing medium having a rough surface, for example, inexpensive printing paper using recycled paper is on sale. Therefore, the plurality of rollers that convey the printing medium may reach the end of the lifetime although the value as the index does not exceed the threshold. Conversely, if a printing medium having a smoother surface than the printing medium in the related art is used, the image forming apparatus may determine that the plurality of rollers reached the end of the lifetime although the plurality of rollers did not reach the end of the lifetime. Such problem leads to deterioration of the quality of an image to be formed on the printing medium, paper clogging during conveyance of the printing medium, and the like, which is not desirable.

DETAILED DESCRIPTION

Figure 1:
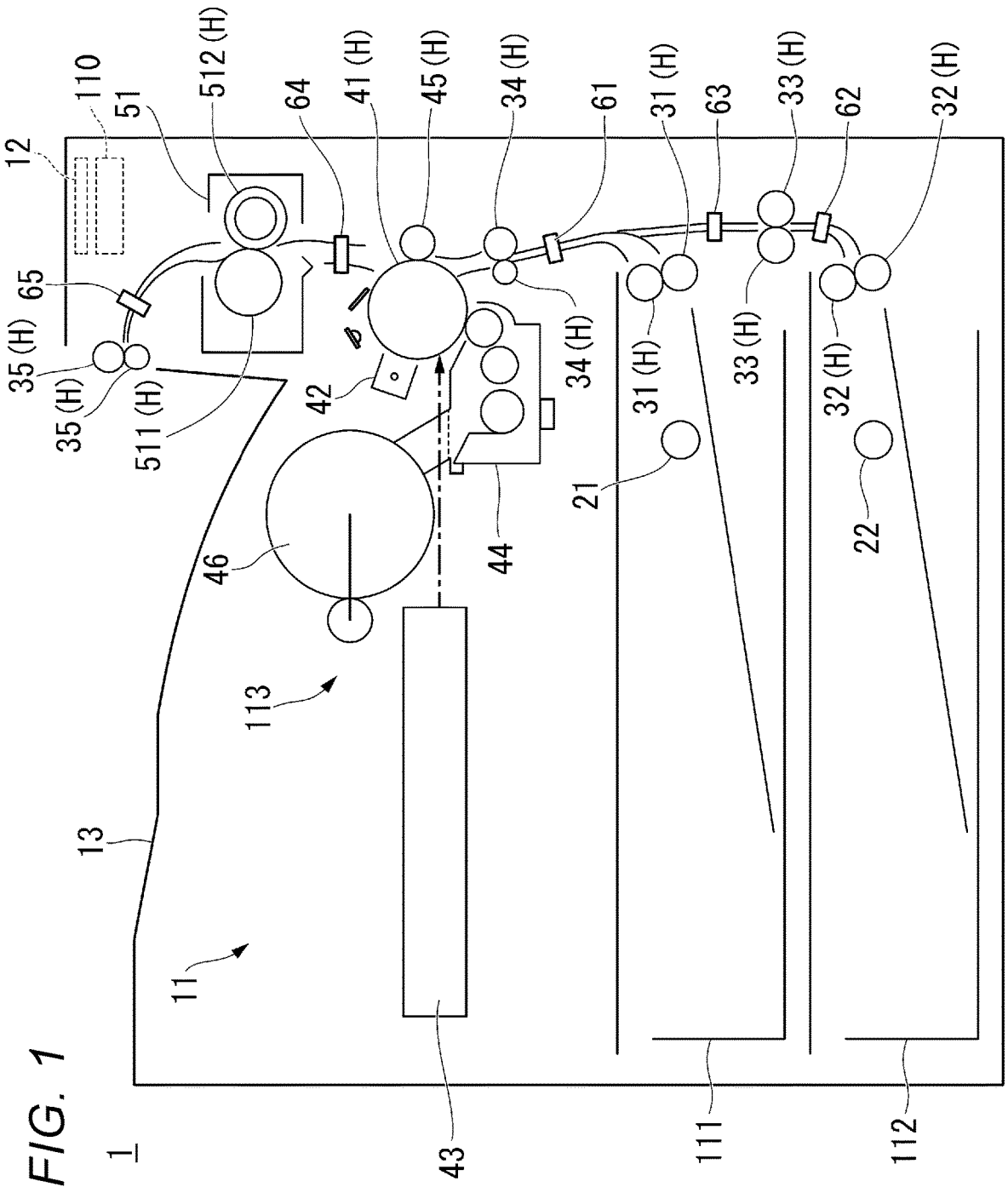
FIG. 1 is a diagram illustrating an example of a configuration of an image forming apparatus according to at least one embodiment.

An image forming apparatus according to at least one embodiment will be described with reference to the drawings. In the respective drawings, the same components will be represented by the same reference numerals. As an example of the image forming apparatus according to the embodiment, an image forming apparatus 1 will be described.

Configuration of Image Forming Apparatus

A configuration of the image forming apparatus 1 will be described with reference to FIG. 1. FIG. 1 is a diagram illustrating an example of the configuration of the image forming apparatus 1 according to at least one embodiment.

The image forming apparatus 1 is also an example of an image processing apparatus that forms an image on a medium as image processing on the medium. For convenience of description, the medium on which an image is formed by the image forming apparatus 1 will be referred to as the printing medium. That is, the image forming apparatus 1 is an apparatus that forms an image on the printing medium. For examples, the image forming apparatus 1 is a multi-function peripheral, a copying machine, or a printer. "On the printing medium" refers to at least one of a front surface of printing medium or a back surface of the printing medium.

The printing medium refers to a medium on which a process such as image formation is to be executed by the image forming apparatus 1. The printing medium may be any medium as long as the printing medium is a sheet-like medium where an image can be formed on at least one of a front surface or a back surface. For example, the printing medium is printing paper, a plastic film, or the like. The front surface of the printing medium refers to a surface that is predetermined as a front-side surface among the two surfaces of the printing medium. The back surface of the printing medium refers to a surface that is predetermined as a back-side surface among the two surfaces of the printing medium.

The image forming apparatus 1 identifies a type of the printing medium on which a process desired by a user is to be executed according to an operation received from the user. The type of the printing medium is classified by a size of the printing medium or the like. After identifying the type of the printing medium, the image forming apparatus 1 forms an image on the printing medium of the pre-identified type according to an operation received from the user.

For example, if the printing medium of the pre-identified type is a first printing medium PRA, the image forming apparatus 1 forms an image on the first printing medium PRA according to an operation received from the user. In the example, the first printing medium PRA is A4-size plain paper. On the other hand, for example, if the pre-identified type of printing medium is a second printing medium PRB, the image forming apparatus 1 forms an image on the second printing medium PRB according to the operation. In the example, the second printing medium PRB is A4-size thick paper.

The image forming apparatus 1 includes, for example, a printer unit 11, a control panel 12, and a paper discharge tray 13. The image forming apparatus 1 may include other members, other devices, and the like in addition to the printer unit 11, the control panel 12, and the paper discharge tray 13.

The printer unit 11 includes a control unit 110 (controller), a paper feed cassette 111, a paper feed cassette 112, and an image forming unit 113.

The control unit 110 controls the entire image forming apparatus 1. In other words, the control unit 110 controls each of the printer unit 11, the control panel 12, and the image forming unit 113. In FIG. 1, the control unit 110 is illustrated at a position different from the actual position to simplify the drawing.

The paper feed cassette 111 accommodates a printing medium of a type desired by the user. The paper feed cassette 111 includes a pickup roller 21. The pickup roller 21 picks up one or more sheets of the printing medium stacked and accommodated in the paper feed cassette 111 one by one in order from the top, and conveys the picked up printing medium to the image forming unit 113.

The paper feed cassette 112 accommodates a printing medium of a type desired by the user. The paper feed cassette 112 includes a pickup roller 22. The pickup roller 22 picks up one or more sheets of the printing medium stacked and accommodated in the paper feed cassette 112 one by one in order from the top, and conveys the picked up printing medium to the image forming unit 113.

The control panel 12 includes an operation reception unit and a display unit (display). In FIG. 1, the control panel 12 is illustrated at a position different from the actual position to simplify the drawing.

The operation reception unit receives an operation from the user. The operation reception unit is an input device and is, for example, a touch pad, an input key, or the like. The operation reception unit outputs information representing the operation received from the user to the control unit 110.

The display unit displays an image corresponding to the operation received via the operation reception unit. The display unit is an image display device, for example, a liquid crystal display, an organic electro luminescence (EL) display, or the like. The display unit may be configured to be integrated with the operation reception unit as a touch panel.

The image forming unit 113 conveys the printing medium and forms an image represented by image data acquired from the control unit 110 on the printing medium under control from the control unit 110. The formation of the image on the printing medium will also be referred to as printing.

The image forming unit 113 includes two first paper feed rollers 31, two second paper feed rollers 32, two conveying rollers 33, two registration rollers 34, and two paper discharge rollers 35. The image forming unit 113 includes a photoconductive drum 41, a charging unit 42, a laser unit 43, a developing unit 44, a transfer roller 45, and a toner bottle 46. The image forming unit 113 includes a fixing device 51. The image forming unit 113 includes a detection unit 61, a detection unit 62, a detection unit 63, a detection unit 64, and a detection unit 65. The image forming unit 113 includes other members such as a photoconductor cleaner in addition to the above-described members. In the embodiment, the description of the other members will be omitted. In the image forming unit 113, the charging unit 42, the developing unit 44, and the transfer roller 45 are disposed around the photoconductive drum 41 that rotates in a direction indicated by an arrow n in FIG. 1. The transfer roller 45 faces the photoconductive drum 41.

The two first paper feed rollers 31 convey the printing medium conveyed from the pickup roller 21 of the paper feed cassette 111 to a gap between the two registration rollers 34.

The two second paper feed rollers 32 convey the printing medium conveyed from the pickup roller 22 of the paper feed cassette 112 to a gap between the two conveying rollers 33 positioned between the two registration rollers 34 and the two second paper feed rollers 32.

The two conveying rollers 33 convey the printing medium conveyed from the two second paper feed rollers 32 to the gap between the two registration rollers 34.

The two registration rollers 34 convey the printing medium conveyed from the two first paper feed rollers 31 to a gap between the photoconductive drum 41 and the transfer roller 45. The two registration rollers 34 convey the printing medium conveyed from the two conveying rollers 33 to the gap between the photoconductive drum 41 and the transfer roller 45.

More specifically, in a nip of the two registration rollers 34, the printing medium conveyed from each of the paper feed cassette 111 and the paper feed cassette 112 is bent. As a result, a position of a leading end of the printing medium is adjusted. A leading end of a printing medium refers to an end portion in a conveying direction in which the printing medium is conveyed among end portions of the printing medium. After adjusting the position of the leading end of the printing medium, at a timing at which the image forming unit 113 transfers a toner image to the printing medium, the two registration rollers 34 convey the printing medium to the gap between the photoconductive drum 41 and the transfer roller 45.

The two paper discharge rollers 35 discharge the printing medium discharged from the fixing device 51 to the paper discharge tray 13.

The photoconductive drum 41 is a cylindrical member having a surface on which the toner image is developed. The photoconductive drum 41 transfers the toner image developed on the surface to the printing medium that is passing between the photoconductive drum 41 and the transfer roller 45.

The charging unit 42 charges the surface of the photoconductive drum 41.

The laser unit 43 exposes the surface of the photoconductive drum 41 charged by the charging unit 42 by laser light. As a result, the laser unit 43 forms an electrostatic latent image on the surface of the photoconductive drum 41.

The developing unit 44 develops the electrostatic latent image formed on the surface of the photoconductive drum 41 by the laser unit as the toner image. Specifically, using a two-component developer formed of a toner and a carrier, the developing unit 44 develops the electrostatic latent image on the surface of the photoconductive drum 41 as the toner image. After transferring the developed toner image to the printing medium, toner remaining on the surface of the photoconductive drum 41 is removed by the photoconductor cleaner or the like.

The transfer roller 45 presses the printing medium against the surface of the photoconductive drum 41 such that the toner image developed on the surface of the photoconductive drum 41 is transferred to the printing medium that is passing between the photoconductive drum 41 and the transfer roller 45.

The toner bottle 46 is a container containing the toner and supplies the toner to the developing unit 44.

The fixing device 51 is a device that fixes the toner image to the printing medium to which the toner image is transferred by the photoconductive drum 41 and the transfer roller 45. In the example illustrated in FIG. 1, the fixing device 51 includes a fixing member 511 and a pressurizing member 512.

The fixing member 511 is, for example, an endless belt that is supported by a support member. The surface of the fixing member 511 is heated using a predetermined heating method. The predetermined heating method may be any method as long as the method can heat the surface of the fixing member 511.

The pressurizing member 512 is a roller that is pressed against an outer peripheral surface of the fixing member 511 and rotates together with the fixing member 511. The pressurizing member 512 may be a driven roller or may be a driving roller. If the pressurizing member 512 is a driven roller, the fixing member 511 rotates around a predetermined axis. On the other hand, if the pressurizing member 512 is a driving roller, the fixing member 511 rotates around a predetermined axis together with the rotation of the pressurizing member 512.

The printing medium to which the toner image is transferred by the photoconductive drum 41 and the transfer roller 45 is conveyed to a gap between the fixing member 511 and the pressurizing member 512 by the photoconductive drum 41 and the transfer roller 45. The printing medium conveyed to the gap between the fixing member 511 and the pressurizing member 512 is heated and pressurized while being conveyed to the paper discharge rollers 35 by the fixing member 511 and the pressurizing member 512. As a result, the toner image transferred to the printing medium is fixed as an image on the printing medium. Accordingly, the fixing device 51 fixes the toner image transferred to the printing medium on the printing medium. As a result, the image is formed on the printing medium.

As such, in the image forming unit 113, the printing medium is conveyed along a predetermined conveyance path by a plurality of members including the two first paper feed rollers 31, the two second paper feed rollers 32, the two conveying rollers 33, the two registration rollers 34, the photoconductive drum 41, the transfer roller 45, the fixing member 511, the pressurizing member 512, and the paper discharge rollers 35. Therefore, in the image forming unit 113, the plurality of members configure a conveying unit (conveyor) H. The conveying unit H may also be configured to include other members, other devices, and the like. The conveying unit H may be configured to include at least one of the pickup roller 21 or the pickup roller 22. In this case, at least one of the pickup rollers is included in the image forming unit 113.

The detection unit 61 (detector) is a sensor that detects passage of the printing medium through a first detection position that is positioned between the two first paper feed rollers 31 and the two registration rollers 34 among positions on the conveyance path along which the printing medium is conveyed by the conveying unit H. The first detection position is a position associated with the detection unit 61 among the positions on the conveyance path. The first detection position is positioned upstream of the two registration rollers 34 on the conveyance path. In the example illustrated in FIG. 1, the first detection position is closer to the two registration rollers 34 than the two first paper feed rollers 31, but the present invention is not limited thereto. For convenience of description, a conveyance path along which the printing medium is conveyed between the two first paper feed rollers 31 and the two registration rollers 34 will be referred to as a first conveyance path. The detection unit 61 (detector) may be any sensor as long as passage of the printing medium through the first detection position on the first conveyance path can be detected.

The detection unit 62 (detector) is a sensor that detects passage of the printing medium through a second detection position that is positioned between the two second paper feed rollers 32 and the two conveying rollers 33 among the positions on the conveyance path along which the printing medium is conveyed by the conveying unit H. The second detection position is a position associated with the detection unit 62 among the positions on the conveyance path. The second detection position is positioned downstream of the two second paper feed rollers 32 on the conveyance path. In the example illustrated in FIG. 1, the second detection position is closer to the two conveying rollers 33 than the two second paper feed rollers 32, but the present invention is not limited thereto. For convenience of description, a conveyance path along which the printing medium is conveyed between the two second paper feed rollers 32 and the two conveying rollers 33 will be referred to as a second conveyance path. The detection unit 62 may be any sensor as long as passage of the printing medium through the second detection position on the second conveyance path can be detected.

The detection unit 63 is a sensor that detects passage of the printing medium through a third detection position that is positioned between the two conveying rollers 33 and the two registration rollers 34 among positions on the conveyance path along which the printing medium is conveyed by the conveying unit H. The third detection position is a position associated with the detection unit 63 among the positions on the conveyance path. The third detection position is positioned downstream of the two conveying rollers 33 on the conveyance path. In the example illustrated in FIG. 1, the third detection position is closer to the two conveying rollers 33 than the two registration rollers 34, but the present invention is not limited thereto. For convenience of description, a conveyance path along which the printing medium is conveyed between the two conveying rollers 33 and the two registration rollers 34 will be referred to as a third conveyance path. As illustrated in FIG. 1, a part of the third conveyance path overlaps the first conveyance path. Therefore, the third detection position is positioned upstream of the first conveyance path on the third conveyance path. The reason is to distinguish between the passage of the printing medium conveyed from the paper feed cassette 111 through the third detection position and the passage of the printing medium conveyed from the paper feed cassette 112 through the third detection position. The detection unit 63 may be any sensor as long as passage of the printing medium through the third detection position on the third conveyance path can be detected.

The detection unit 64 is a sensor that detects passage of the printing medium through a fourth detection position that is positioned between the transfer roller 45 and the fixing device 51 among the positions on the conveyance path along which the printing medium is conveyed by the conveying unit H. The fourth detection position may be also referred to as a position between the fixing device 51 and the gap between the photoconductive drum 41 and the transfer roller 45 among the positions on the conveyance path. The fourth detection position is a position associated with the detection unit 64 among the positions on the conveyance path. The fourth detection position is positioned downstream of the fixing device 51 on the conveyance path. In the example illustrated in FIG. 1, the fourth detection position is positioned near an intermediate position between the transfer roller 45 and the fixing device 51, but the present invention is not limited thereto. For convenience of description, a conveyance path along which the printing medium is conveyed between the transfer roller 45 and the fixing device 51 will be referred to as a fourth conveyance path. The detection unit 64 may be any sensor as long as passage of the printing medium through the fourth detection position on the fourth conveyance path can be detected.

The detection unit 65 is a sensor that detects passage of the printing medium through a fifth detection position that is positioned between the fixing device 51 and the two paper discharge rollers 35 among the positions on the conveyance path along which the printing medium is conveyed by the conveying unit H. The fifth detection position is a position associated with the detection unit 65 among the positions on the conveyance path. The fifth detection position is positioned upstream of the two paper discharge rollers 35 on the conveyance path. In the example illustrated in FIG. 1, the fifth detection position is closer to the two paper discharge rollers 35 than the fixing device 51, but the present invention is not limited thereto. For convenience of description, a conveyance path along which the printing medium is conveyed between the fixing device 51 and the two paper discharge rollers 35 will be referred to as a fifth conveyance path. The detection unit 65 may be any sensor as long as passage of the printing medium through the fifth detection position on the fifth conveyance path can be detected.

In the image forming apparatus 1 having the above-described configuration, the control unit 110 executes a deterioration determination process of determining whether each of the rollers in the conveying unit H is deteriorated according to a received operation.

In the deterioration determination process, the control unit 110 uses, for example, a combination of two detection units among the five detection units 61 to 65. For convenience of description, a detection unit that is positioned on the upstream side among the two detection units will be referred to as a first detection unit, and a detection unit that is positioned on the downstream side among the two detection units will be referred to as a second detection unit.

For convenience of description, if the detection unit 62 is the first detection unit and the detection unit 63 is the second detection unit, a combination of the detection unit 62 and the detection unit 63 will be referred to as a first combination. For convenience of description, if the detection unit 62 is the first detection unit and the detection unit 61 is the second detection unit, a combination of the detection unit 61 and the detection unit 62 will be referred to as a second combination. For convenience of description, if the detection unit 62 is the first detection unit and the detection unit 64 is the second detection unit, a combination of the detection unit 62 and the detection unit 64 will be referred to as a third combination. For convenience of description, if the detection unit 62 is the first detection unit and the detection unit 65 the is second detection unit, a combination of the detection unit 62 and the detection unit 65 will be referred to as a fourth combination.

For convenience of description, if the detection unit 63 is the first detection unit and the detection unit 61 is the second detection unit, a combination of the detection unit 61 and the detection unit 63 will be referred to as a fifth combination. For convenience of description, if the detection unit 63 is the first detection unit and the detection unit 64 is the second detection unit, a combination of the detection unit 63 and the detection unit 64 will be referred to as a sixth combination. For convenience of description, if the detection unit 63 is the first detection unit and the detection unit 65 is the second detection unit, a combination of the detection unit 63 and the detection unit 65 will be referred to as a seventh combination.

For convenience of description, if the detection unit 61 is the first detection unit and the detection unit 64 is the second detection unit, a combination of the detection unit 61 and the detection unit 64 will be referred to as an eighth combination. For convenience of description, if the detection unit 61 is the first detection unit and the detection unit 65 is the second detection unit, a combination of the detection unit 61 and the detection unit 65 will be referred to as a ninth combination.

For convenience of description, if the detection unit 64 is the first detection unit and the detection unit 65 is the second detection unit, a combination of the detection unit 64 and the detection unit 65 will be referred to as a tenth combination.

The control executes unit 110 the deterioration determination process using one or more combinations among ten combinations of the first combination to the tenth combination described above. For example, a case where the control unit 110 executes the deterioration determination process using the second combination will be described.

In the deterioration determination process, the control unit 110 controls the conveying unit H such that a printing medium used in the deterioration determination process is conveyed to the paper discharge tray 13 without forming an image on the printing medium. As a result, in the deterioration determination process, the control unit 110 detects a time difference between a first timing and a second timing. The first timing refers to a timing at which the first detection unit detects the printing medium. If the first detection unit is the detection unit 62 as in the example, the first timing refers to a timing at which the detection unit 62 detects the printing medium. The second timing refers to a timing at which the second detection unit detects the printing medium. If the second detection unit is the detection unit 61 as in the example, the second timing refers to a timing at which the detection unit 61 detects the printing medium. For convenience of description, the time difference between the first timing and the second timing will be referred to as a target time difference. In other words, the target time difference refers to a period of time required for the printing medium to pass a section between a position associated with the first detection unit and a position associated with the second detection unit on the conveyance path. That is, in the example, the target time difference refers to a period of time required for the printing medium to pass a section between the second detection position associated with the detection unit 62 and the first detection position associated with the detection unit 61.

The target time difference increases according to the deterioration of each of the rollers in the conveying unit H. That is, a target time difference if each of the rollers is deteriorated is longer than a target time difference if each of the rollers is not deteriorated. The reason is that the deterioration of each of the rollers occurs due to wear with the printing medium. For convenience of description, the target time difference if each of the rollers is deteriorated will be referred to as a deteriorated state time difference, and the target time difference if each of the rollers is not deteriorated will be referred to as a non-deteriorated state time difference. In the deterioration determination process, the control unit 110 can determine whether each of the rollers is deteriorated based on the deteriorated state time difference.

Figure 2:
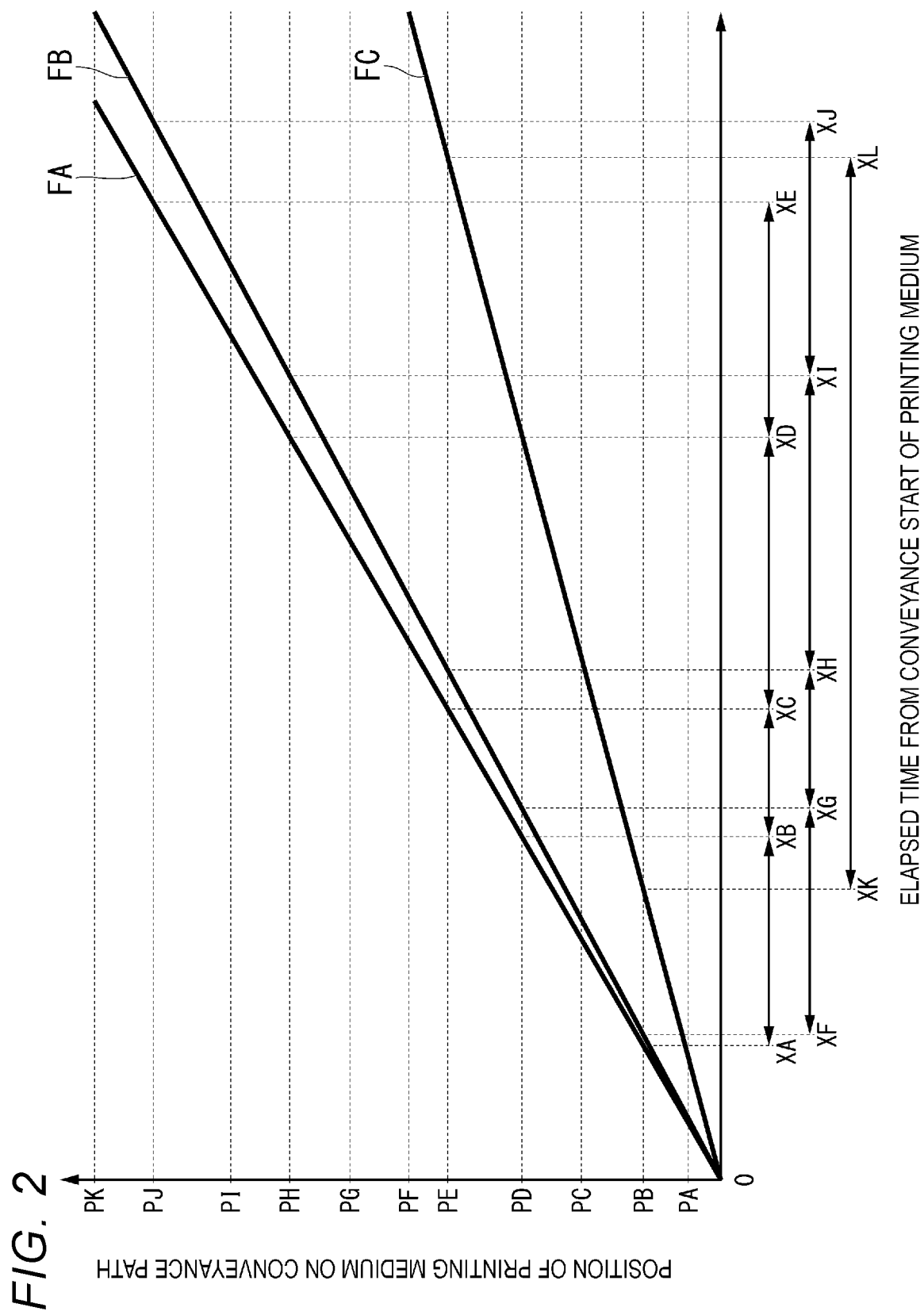
FIG. 2 is a diagram illustrating an example of each of a non-deteriorated state time difference and a deteriorated state time difference.

FIG. 2 is a diagram illustrating an example of each of the non-deteriorated state time difference and the deteriorated state time difference. In a graph illustrated in FIG. 2, the horizontal axis represents an elapsed time from the start of the conveyance of the printing medium by the conveying unit H. Therefore, at the starting point of the graph, the elapsed time is 0. Meanwhile, in the graph, the vertical axis represents a position of the printing medium on the conveyance path from the start of the conveyance. The position of the printing medium on the conveyance path is represented by, for example, the position of the leading end of the printing medium on the conveyance path. The position of the printing medium on the conveyance path may also be represented by, for example, another position of the printing medium on the conveyance path. A straight line FA plotted on the graph represents a change over time in the position of the printing medium if the printing medium is conveyed at a first conveying speed if each of the rollers in the conveying unit H is not deteriorated. A straight line FB plotted on the graph represents a change over time in the position of the printing medium if the printing medium is conveyed at a first conveying speed if each of the rollers in the conveying unit H is deteriorated. The first conveying speed refers to a conveying speed that is set for the conveying unit H as a conveying speed at which the printing medium is conveyed if whether each of the rollers in the conveying unit H is deteriorated is not being determined. The conveying speed at which the printing medium is conveyed if whether each of the rollers in the conveying unit H is deteriorated is not being determined refers to a conveying speed or the like at which the printing medium is conveyed, for example, if an image is formed on the printing medium.

In the example illustrated in FIG. 2, the printing medium conveyed by the conveying unit H is the printing medium accommodated in the paper feed cassette 112. Therefore, the starting point of the graph illustrated in FIG. 2 is positioned upstream of the two second paper feed rollers 32 on the conveyance path. The starting point represents the position of the printing medium accommodated in the paper feed cassette 112 before the printing medium is picked up by the pickup roller 22. Accordingly, the position of the printing medium on the graph is represented by a relative distance from the starting point.

A position PA in the graph illustrated in FIG. 2 represents the position of the two second paper feed rollers 32. The position of the two second paper feed rollers 32 refers to a position between the two second paper feed rollers 32 among the positions on the conveyance path. A position PB in the graph represents the second detection position. A position PC in the graph represents the position of the two conveying rollers 33. The position of the two conveying rollers 33 refers to a position between the two conveying rollers 33 among the positions on the conveyance path. A position PD in the graph represents the third detection position. A position PE in the graph represents the first detection position. A position PF in the graph represents the position of the two registration rollers 34. The position of the two registration rollers 34 refers to a position between the two registration rollers 34 among the positions on the conveyance path. A position PG in the graph represents the position of the transfer roller 45. The position of the transfer roller 45 refers to a position between the photoconductive drum 41 and the transfer roller 45 among the positions on the conveyance path. A position PH in the graph represents the fourth detection position. A position PI in the graph represents the position of the fixing device 51. The position of the fixing device 51 refers to a position between the fixing member 511 and the pressurizing r 512 among the positions on the conveyance path. A position PJ in the graph represents the fifth detection position. A position PK in the graph represents the position of the two paper discharge rollers 35. The position of the two paper discharge rollers 35 refers to a position between the two paper discharge rollers 35 among the positions on the conveyance path. For convenience of description, the positions PB, PD, PE, PH, and PJ will be collectively referred to as the positions PB to PJ.

A timing XA in the graph illustrated in FIG. 2 represents a timing at which the printing medium of which the position changes along the straight line FA passes the position PB. A timing XB represents a timing at which the printing medium passes the position PD. A timing XC represents a timing at which the printing medium passes the position PE. A timing XD represents a timing at which the printing medium passes the position PH. A timing XE represents a timing at which the printing medium passes the position PJ.

A timing XF in the graph illustrated in FIG. 2 represents a timing at which the printing medium of which the position changes along the straight line FB passes the position PB. A timing XG represents a timing at which the printing medium passes the position PD. A timing XH represents a timing at which the printing medium passes the position PE. A timing XI represents a timing at which the printing medium passes the position PH. A timing XJ represents a timing at which the printing medium passes the position PJ.

On the graph illustrated in FIG. 2, the timing XF is later than the timing XA. On the graph, the timing XG is later than the timing XB. On the graph, the timing XH is later than the timing XC. On the graph, the timing XI is later than the timing XD. On the graph, the timing XJ is later than the timing XE. The results show that, if each of the rollers in the conveying unit H is deteriorated due to wear, a speed at which the printing medium is actually conveyed by the conveying unit H is slower than a conveying speed that is set for the conveying unit H. Therefore, the deteriorated state time difference is longer than the non-deteriorated state time difference. In the example illustrated in FIG. 2, the non-deteriorated state time difference is a time difference between the timing XA and the timing XC. In other words, if the control unit 110 uses the second combination in the deterioration determination process, the non-deteriorated state time difference is the time difference between the timing XA and the timing XC. On the other hand, in the example, the deteriorated state time difference is a time difference between the timing XF and the timing XH. In other words, here, the deteriorated state time difference is a time difference between the timing XF and the timing XH. As illustrated in FIG. 2, the deteriorated state time difference as the time difference between the timing XF and the timing XH is longer than the non-deteriorated state time difference as the time difference between the timing XA and the timing XC. However, such difference between the non-deteriorated state time difference and the deteriorated state time difference decreases as the first conveying speed set for the conveying unit H increases. That is, as the first conveying speed set for the conveying unit H increases, it is difficult for the control unit 110 to detect the difference between the non-deteriorated state time difference and the deteriorated state time difference. It means that, as the first conveying speed increases, the control unit 110 cannot accurately determine whether each of the rollers is deteriorated.

Accordingly, in the deterioration determination process, the control unit 110 controls the conveying unit H such that the printing medium is conveyed at a second conveying speed slower than the first conveying speed. In other words, in the deterioration determination process, as the conveying speed at which the printing medium is conveyed, the control unit 110 sets the conveying speed set for the conveying unit H to the second conveying speed slower than the first conveying speed. As a result, in the deterioration determination process, the control unit 110 can increase the difference between the non-deteriorated state time difference and the deteriorated state time difference. Accordingly, the control unit 110 can accurately determine whether each of the rollers in conveying unit H is deteriorated based on the deteriorated state time difference by comparing to a case where the first conveying speed is set for the conveying unit H. The second conveying speed is a conveying speed at which the printing medium is conveyed if whether each of the rollers in the conveying unit H is deteriorated is being determined. The second conveying speed may be any speed as long as the second conveying speed is slower than the first conveying speed and is a speed based on which whether each of the rollers is deteriorated can be accurately determined. For example, the second conveying speed is determined by a pre-experiment, a simulation, or the like. For example, the second conveying speed is ½ of the first conveying speed, but the embodiment is not limited thereto.

A straight line FC plotted on the graph illustrated in FIG. 2 represents a change over time in the position of the printing medium if the printing medium is conveyed at the second conveying speed if each of the rollers in the conveying unit H is deteriorated. A timing XK in the graph represents a timing at which the printing medium of which the position changes along the straight line FC passes the position PB. A timing XL represents a timing at which the printing medium passes the position PE. That is, if the control unit 110 uses the second combination in the deterioration determination process and if the conveying speed set for the conveying unit H is the second conveying speed, the deteriorated state time difference is a time difference between the timing XK and the timing XL. As illustrated in FIG. 2, the deteriorated state time difference as the time difference between the timing XK and the timing XL is further longer than the deteriorated state time difference as the time difference between the timing XF and the timing XH. As such, in the deterioration determination process, by setting the second conveying speed in the conveying unit H, the control unit 110 can increase the difference between the non-deteriorated state time difference and the deteriorated state time difference. As a result, the control unit 110 can accurately determine whether each of the rollers in the conveying unit H is deteriorated based on the deteriorated state time difference by comparing to a case where the first conveying speed is set for the conveying unit H.

The control unit 110 may execute the calculation of the deteriorated state time difference as above using any one of the first combination to the tenth combination or using any two or more among the first combination to the tenth combination.

Functional Configuration of Control Unit

Figure 3:
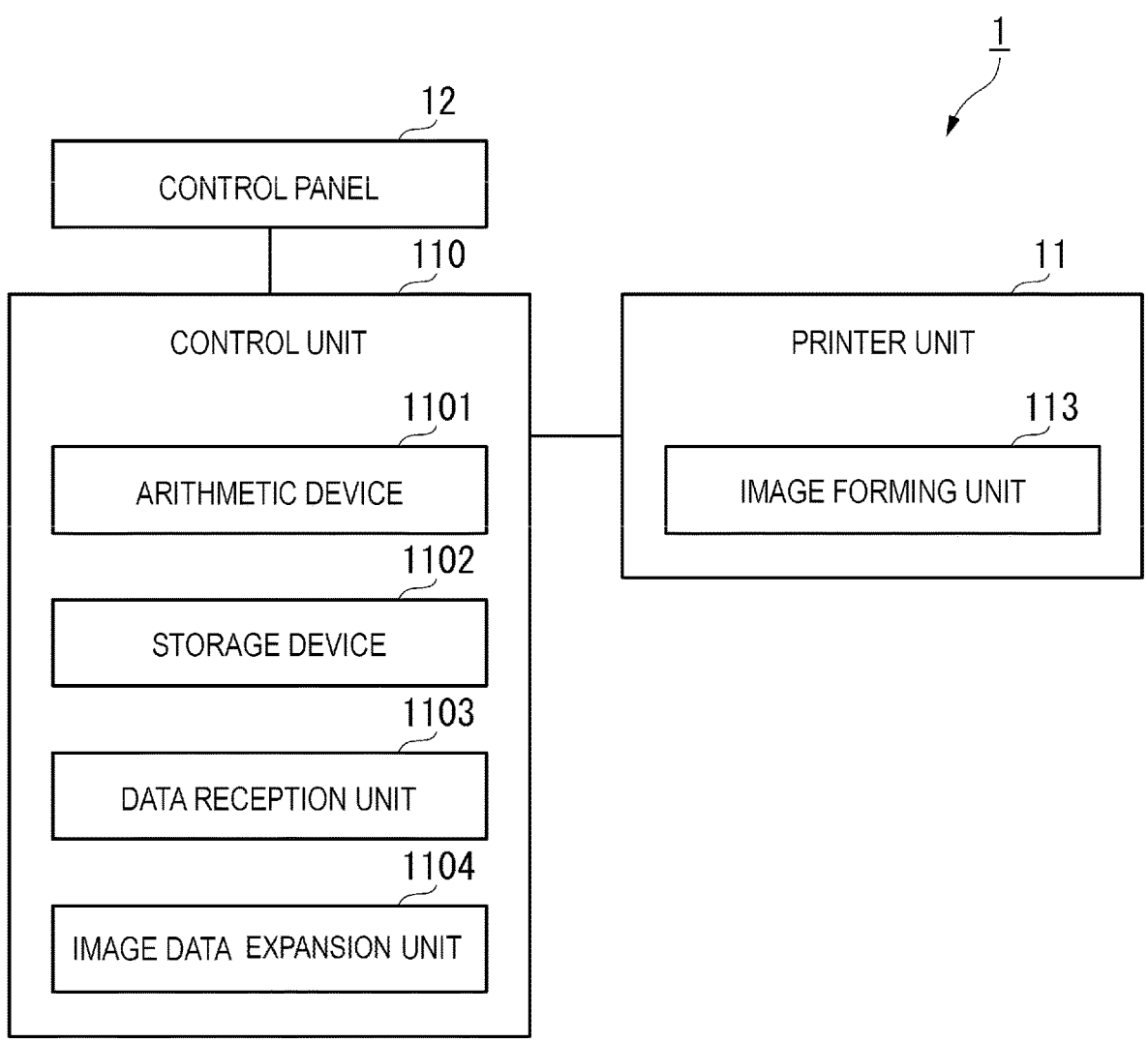
FIG. 3 is a diagram illustrating an example of a functional configuration of a control unit.

Next, a functional configuration of the control unit 110 will be described with reference to FIG. 3. FIG. 3 is a diagram illustrating an example of the functional configuration of the control unit 110.

As illustrated in FIG. 3, the control unit 110 is communicatively connected to each of the printer unit 11 and the control panel 12. The control unit 110 includes an arithmetic device 1101, a storage device 1102, a data reception unit 1103, and an image data expansion unit 1104.

The arithmetic device 1101 is, for example, a central processing unit (CPU), an application specific integrated circuit (ASIC), or the like. The arithmetic device 1101 controls each of the printer unit 11 and the control panel 12 according to an image processing program stored in the storage device 1102.

The storage device 1102 is a read only memory (ROM), a random access memory (RAM), a hard disk drive (HDD), a solid state drive (SSD), or the like. The storage device 1102 may be separately provided from the control unit 110. The storage device 1102 is an example of a storage unit.

The data reception unit 1103 receives print data (for example, data described in a page description language and the like) representing an image to be printed from a host such as a personal computer (PC), and stores the received print data in the storage device 1102.

The image data expansion unit 1104 determines printing conditions from the print data that is stored in the storage device 1102 by the data reception unit 1103 to extract data (for example, raster data and the like) that is printable by the printer unit 11, and stores the expanded data in the storage device 1102.

Flow of Deterioration Determination Process to be Executed by Control Unit 110

Figure 4:
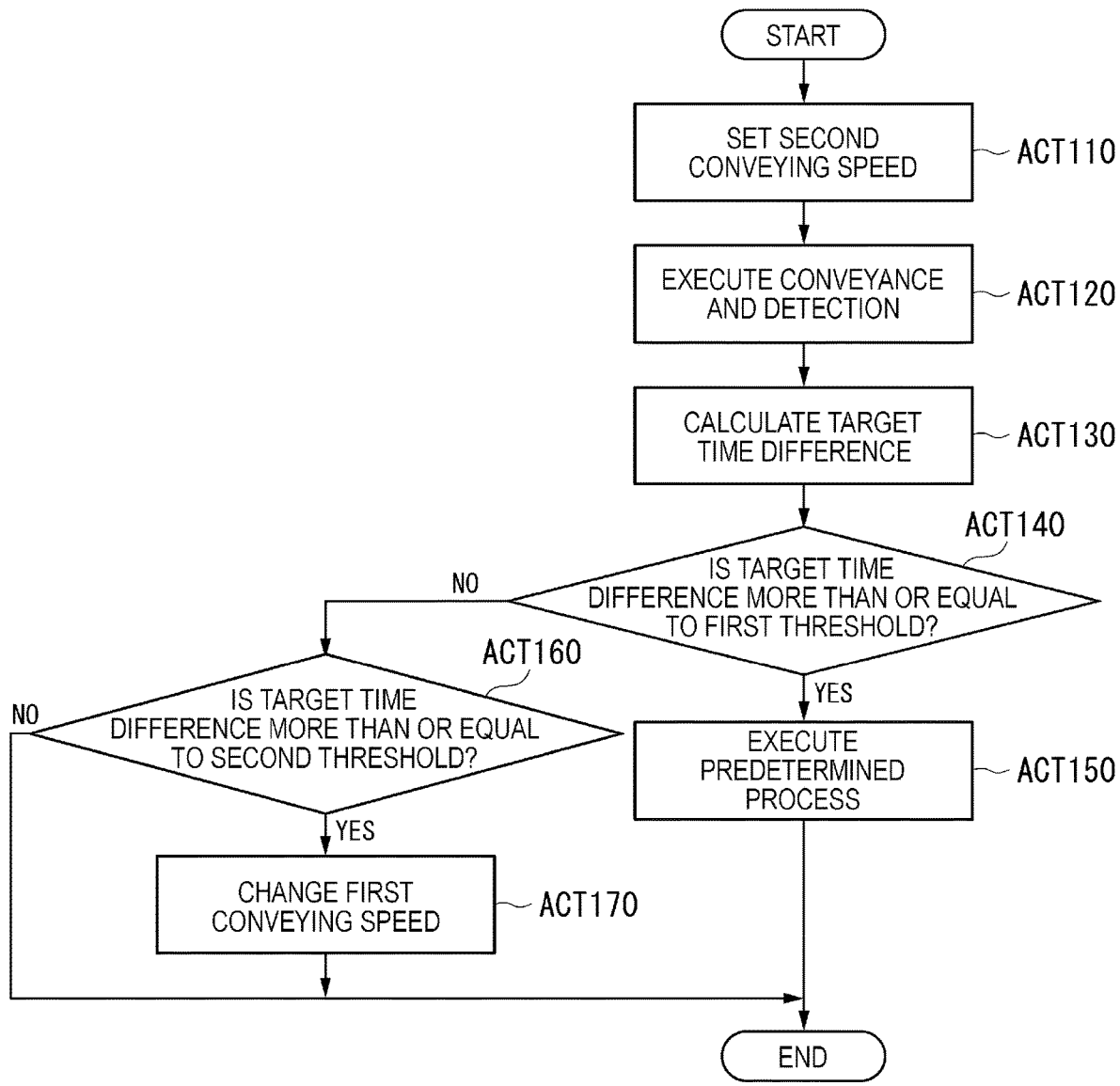
FIG. 4 is a diagram illustrating an example of the flow of a deterioration determination process to be executed by the control unit.

The flow of the deterioration determination process to be executed by the control unit 110 will be described with reference to FIG. 4. FIG. 4 is a diagram illustrating an example of the flow of the deterioration determination process to be executed by the control unit 110. For example, a case where the control unit 110 receives a process start operation for causing the image forming apparatus 1 to execute the deterioration determination process at a timing before executing the process of ACT 110 illustrated in FIG. 4 will be described. For example, a case where the control unit 110 executes the deterioration determination process of determining whether each of the rollers in the conveying unit H is deteriorated using the second combination will be described.

After receiving the process start operation, the control unit 110 sets the second conveying speed for the conveying unit H as the conveying speed at which the printing medium is conveyed (ACT 110).

Next, the control unit 110 executes the conveyance of the printing medium by the conveying unit H and the detection of passage of the printing medium by each of the first detection unit and the second detection unit (ACT 120). For example, in ACT 120, while conveying the printing medium accommodated in the paper feed cassette 112 to the paper discharge tray 13, the control unit 110 detects the passage of the printing medium by each of the first detection unit and the second detection unit.

Next, the control unit 110 calculates the target time difference based on the output from each of the first detection unit and the second detection unit in ACT 120 (ACT 130).

Next, the control unit 110 determines whether the target time difference calculated in ACT 130 is more than or equal to a predetermined first threshold (ACT 140). The first threshold may be any value. For example, the first threshold is determined among target time differences that are shorter than a target time difference immediately before the occurrence of malfunction in each of the rollers in the conveying unit H based on a pre-experiment, a simulation, or the like.

If the control unit 110 determines that the target time difference calculated in ACT 130 is more than or equal to the first threshold (ACT 140—YES), the control unit 110 executes a predetermined process (ACT 150). The predetermined process includes a process of causing the display unit of the control panel 12 to display information representing that each of the rollers in the conveying unit H is deteriorated. The predetermined process may include, for example, a process of causing a sound output unit to output a sound representing that each of the rollers is deteriorated in addition to the process of causing the display unit to display the information. Then, the image forming apparatus 1 includes the sound output unit. The sound output unit is, for example, a speaker, but the embodiment is not limited thereto. The predetermined process may include, for example, a process of outputting information representing that each of the rollers is deteriorated to an information processing apparatus that is communicatively connected to the image forming apparatus 1 in addition to the process of causing the display unit to display the information. The information processing apparatus is, for example, a server or a desktop personal computer (PC) in a company to which a repair person who executes maintenance of the image forming apparatus 1 belongs or a laptop PC of the repair person, but the embodiment is not limited thereto. The predetermined process may be configured to include another process corresponding to the deterioration of each of the rollers.

After executing the process of ACT 150, the control unit 110 executes the process of the flowchart illustrated in FIG. 4.

On the other hand, if the control unit 110 determines that the target time difference calculated in ACT 130 is less than the first threshold (ACT 140—NO), the control unit 110 determines whether the target time difference is more than or equal to a predetermined second threshold (ACT 160). The second threshold may be any value as long as it is shorter than the first threshold, that is, less than the first threshold. For example, the second threshold is ½ of the first threshold, but the embodiment is not limited thereto.

If the control unit 110 determines that the target time difference calculated in ACT 130 is more than or equal to the second threshold (ACT 160—YES), the control unit 110 changes the value of the first conveying speed set for the conveying unit H (ACT 170). Specifically, the control unit 110 increases the value of the first conveying speed in ACT 170. For convenience of description, the first conveying speed of which the value is not yet changed by the process of ACT 170 will be referred to as a pre-change first conveying speed, and the first conveying speed of which the value is changed by the process of ACT 170 will be referred to as a post-change first conveying speed. According to the process of ACT 170, the control unit 110 can set the actual conveying speed at which the printing medium is conveyed to be closer to the pre-change first conveying speed when not determining whether each of the rollers in the conveying unit H is deteriorated. It is because, even if the post-change first conveying speed is set for the conveying unit H, each of the rollers is deteriorated due to wear, such that the actual conveying speed at which the printing medium is conveyed by each of the rollers does not reach the post-change first conveying speed and is closer to the pre-change first conveying speed. The post-change first conveying speed is determined, for example, by a pre-experiment, a simulation, or the like such that the actual conveying speed does not exceed the pre-change first conveying speed.

After executing the process of ACT 170, the control unit 110 ends the process of the flowchart illustrated in FIG. 4.

On the other hand, if the control unit 110 determines that the target time difference calculated in ACT 130 is less than the second threshold (ACT 160—NO), the control unit 110 ends the process of the flowchart illustrated in FIG. 4.

As described above, if the image forming apparatus 1 determines whether the conveying member is deteriorated, the image forming apparatus 1 controls the conveying unit H such that the printing medium is conveyed at the second conveying speed that is slower than the first conveying speed at which the printing medium is conveyed if the control unit 110 does not determine whether the conveying member is deteriorated. Here, the image forming apparatus 1 determines whether each of the rollers in the conveying unit H is deteriorated based on the first timing at which the printing medium is detected by the first detection unit and the second timing at which the printing medium is detected by the second detection unit. As a result, the image forming apparatus 1 can replace each of the rollers at an appropriate timing. As a result, the image forming apparatus 1 can prevent the occurrence of malfunction during conveyance of the printing medium.

In the example described above, in the deterioration determination process, assuming that all of the rollers in the conveying unit H configure one conveying member, the control unit 110 determined whether the one conveying member is deteriorated. However, in the deterioration determination process, the control unit 110 may be configured to determine whether a part of the rollers is deteriorated. Specifically, the control unit 110 may be configured to determine whether rollers corresponding to the first detection unit and the second detection unit on the conveyance path among the rollers are deteriorated. The rollers corresponding to the first detection unit and the second detection unit on the conveyance path may be, for example, rollers interposed between the first detection unit and the second detection unit on the conveyance path. The rollers corresponding to the first detection unit and the second detection unit on the conveyance path may be rollers between which the first detection unit and the second detection unit are interposed on the conveyance path in addition to the rollers interposed between the first detection unit and the second detection unit on the conveyance path. For example, if the control unit 110 executes the deterioration determination process using the first combination, the control unit 110 may be configured to determine whether the two conveying rollers 33 are deteriorated and not to determine whether the other rollers are deteriorated. Here, in ACT 150, the control unit 110 causes the display unit of the control panel 12 to display information representing that the two conveying rollers 33 are deteriorated. Here, the control unit 110 may be configured to cause the sound output unit to output a sound representing that the two conveying rollers 33 are deteriorated or may be configured to output the information to the above-described information processing apparatus. For example, if the detection unit 62 is the first detection unit and the detection unit 63 is the second detection unit, the control unit 110 may determine whether the following six rollers are deteriorated. The six rollers include the two second paper feed rollers 32, the two conveying rollers 33, and the two registration rollers 34. Here, in ACT 150, the control unit 110 causes the display unit of the control panel 12 to display information representing that the six rollers are deteriorated. Here, the control unit 110 may be configured to cause the sound output unit to output a sound representing that the six rollers are deteriorated or may be configured to output the information to the above-described information processing apparatus.

The control unit 110 may be configured to execute the deterioration determination process for each of two or more combinations among the first combination to the tenth combination. For example, the control unit 110 may be configured to execute the respective deterioration determination processes of the first combination and the eighth combination in parallel or in sequence. Here, the control unit 110 can determine, for example, whether the two second paper feed rollers 32 are deteriorated and whether the transfer roller 45 is deteriorated.

The control unit 110 may be configured to start the deterioration determination process at a predetermined timing instead of or in addition to the timing at which the process start operation is received. The predetermined timing is, for example, 7:00 in the morning on every Monday, but the embodiment is not limited thereto.

The control unit 110 may be configured to change the value of the second conveying speed, that is, the second conveying speed, depending on the thickness of the printing medium. For example, if the printing medium is thick paper, the control unit 110 increases the value of the second conveying speed by a predetermined value. Note that the increased second conveying speed is also slower than the first conveying speed. Accordingly, in the image forming apparatus 1, for example, during conveyance of the printing medium by the deteriorated rollers, inaccurate execution of the deterioration determination process caused by a very slow conveying speed can be prevented. The control unit 110 may be configured to identify the thickness of the printing medium according to a received operation or may be configured to detect the thickness of the printing medium using a media sensor or the like.

Modification Example of Flow of Deterioration Determination Process to be Executed by Control Unit 110

A modification example of the flow of the deterioration determination process to be executed by the control unit 110 will be described. In the deterioration determination process described in FIG. 4, the control unit 110 does not cause the image forming unit 113 to form an image on the printing medium. However, the control unit 110 may be configured to execute the deterioration determination process while causing the image forming unit 113 to form an image on the printing medium.

Figure 5:
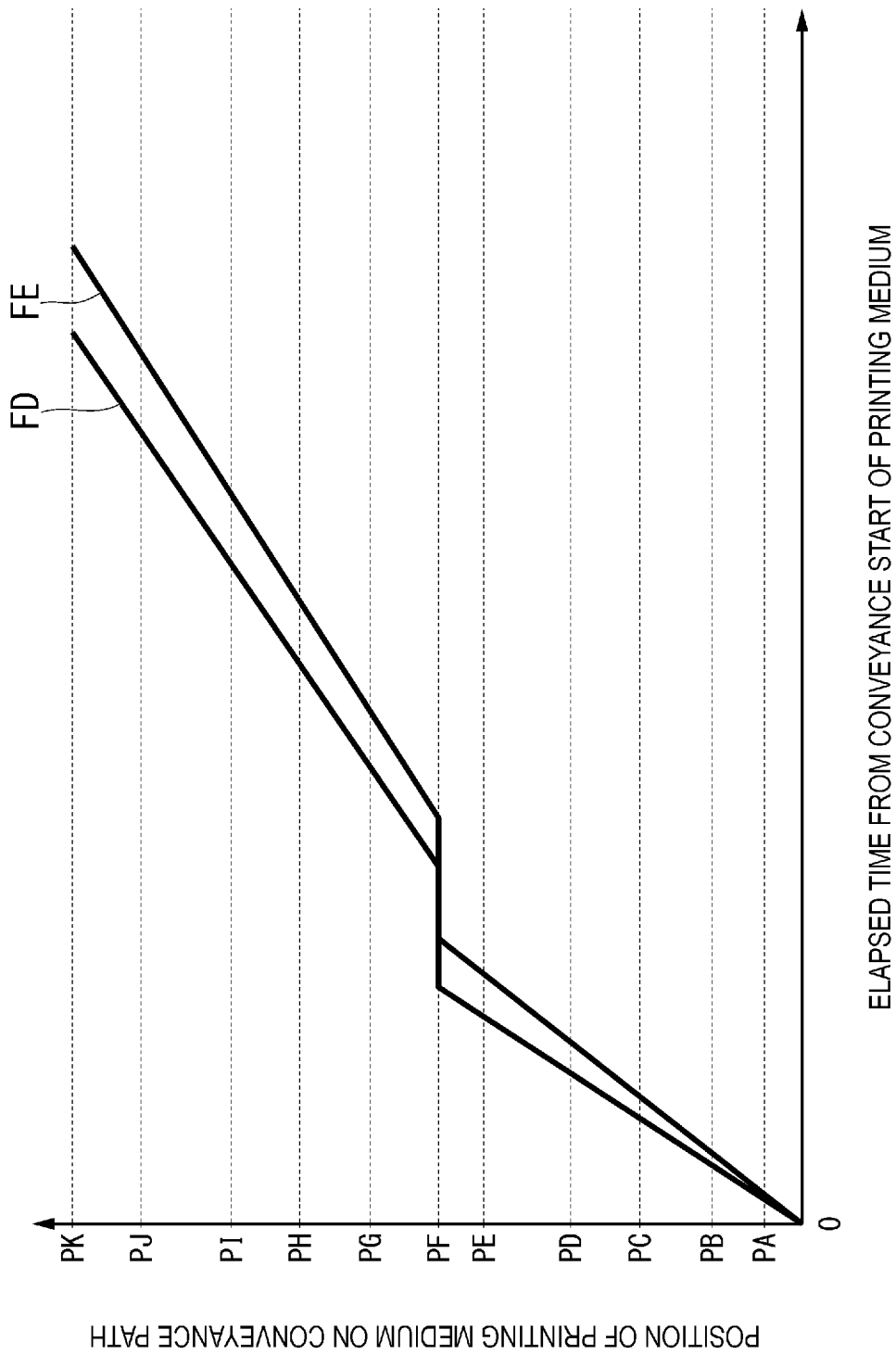
FIG. 5 is a diagram illustrating another example of each of the non-deteriorated state time difference and the deteriorated state time difference.

FIG. 5 is a diagram illustrating another example of each of the non-deteriorated state time difference and the deteriorated state time difference. In a graph illustrated in FIG. 5, the horizontal axis is the same as the horizontal axis in the graph illustrated in FIG. 2. Note that an interval of the scale of the horizontal axis in the graph illustrated in FIG. 5 is further extended from the interval of the scale of the horizontal axis in the graph illustrated in FIG. 2. The reason is to clearly represent a difference between two broken lines plotted on the graph illustrated in FIG. 5. In the graph illustrated in FIG. 5, the vertical axis is also the same as the vertical axis in the graph illustrated in FIG. 2. A broken line FD plotted on the graph illustrated in FIG. 5 represents a change over time in the position of the printing medium if the printing medium is conveyed at the first conveying speed if each of the rollers in the conveying unit H is not deteriorated. On the other hand, a broken line FE plotted on the graph represents a change over time in the position of the printing medium if the printing medium is conveyed at a first conveying speed if each of the rollers in the conveying unit H is deteriorated. Note that each of the broken line FD and the broken line FE represents a change over time in the position of the printing medium that is conveyed to form an image.

As illustrated in FIG. 5, even in the change over time in the position of the printing medium that is conveyed to form an image, the deteriorated state time difference is longer than the non-deteriorated state time difference. Therefore, if an image is formed on the printing medium, the control unit 110 sets the conveying speed at which the printing medium is conveyed to the second conveying speed such that a difference between the non-deteriorated state time difference and the deteriorated state time difference can be increased. That is, even if an image is formed on the printing medium, the control unit 110 can execute the deterioration determination process.

Figure 6:
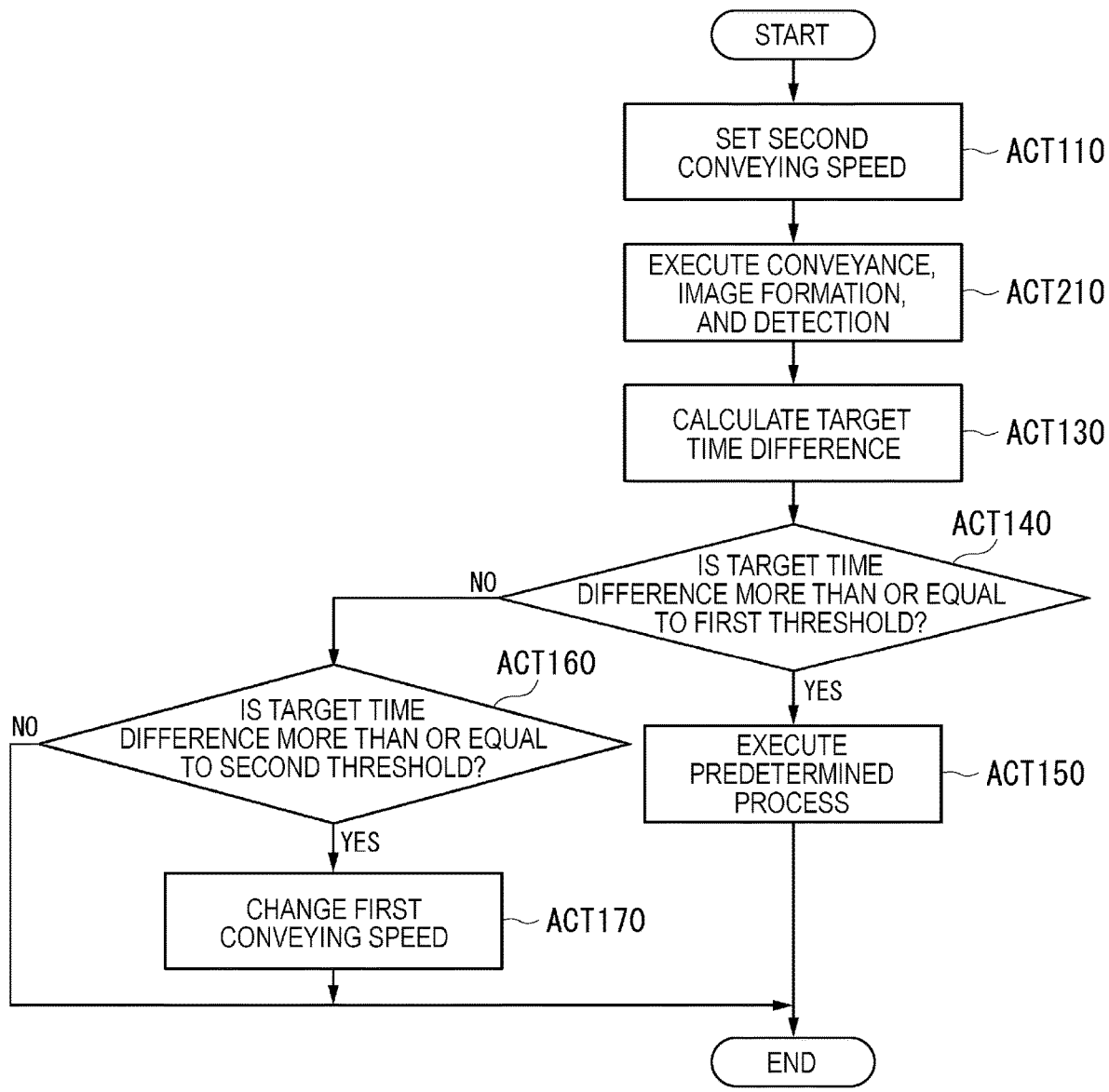
FIG. 6 is a diagram illustrating another example of the flow of the deterioration determination process to be executed by the control unit.

FIG. 6 is a diagram illustrating another example of the flow of the deterioration determination process to be executed by the control unit 110. For example, a case where the control unit 110 receives a process start operation for causing the image forming apparatus 1 to execute the deterioration determination process at a timing before executing the process of ACT 110 illustrated in FIG. 6 will be described. For example, a case where the control unit 110 executes the deterioration determination process of determining whether each of the rollers in the conveying unit H is deteriorated using the second combination will be described. Here, the process of ACT 110 illustrated in FIG. 6 is the same as the process of ACT 110 illustrated in FIG. 4. Here, the processes of ACT 130 to ACT 170 illustrated in FIG. 6 is the same as the processes of ACT 130 to ACT 170 illustrated in FIG. 4. Therefore, the description of the details of each of the process of ACT 110 illustrated in FIG. 6 and the processes of ACT 130 to ACT 170 illustrated in FIG. 6 will be omitted.

After setting the second conveying speed for the conveying unit H in ACT 110, the control unit 110 executes the conveyance of the printing medium by the conveying unit H, the formation of an image on the printing medium by the image forming unit 113, and the detection of the passage of the printing medium by each of the first detection unit and the second detection unit (ACT 210). Accordingly, the control unit 110 can execute the deterioration determination process while forming an image on the printing medium.

Modification Example of Embodiment

A modification example of the embodiment will be described with reference to FIG. 7. In the modification example of the embodiment, the deterioration determination process to be executed by the image forming apparatus 1 may be executed by an image reading apparatus 2 illustrated in FIG. 7 instead of the image forming apparatus 1. That is, the image reading apparatus 2 executes the deterioration determination process according to an operation received from a user.

Figure 7:
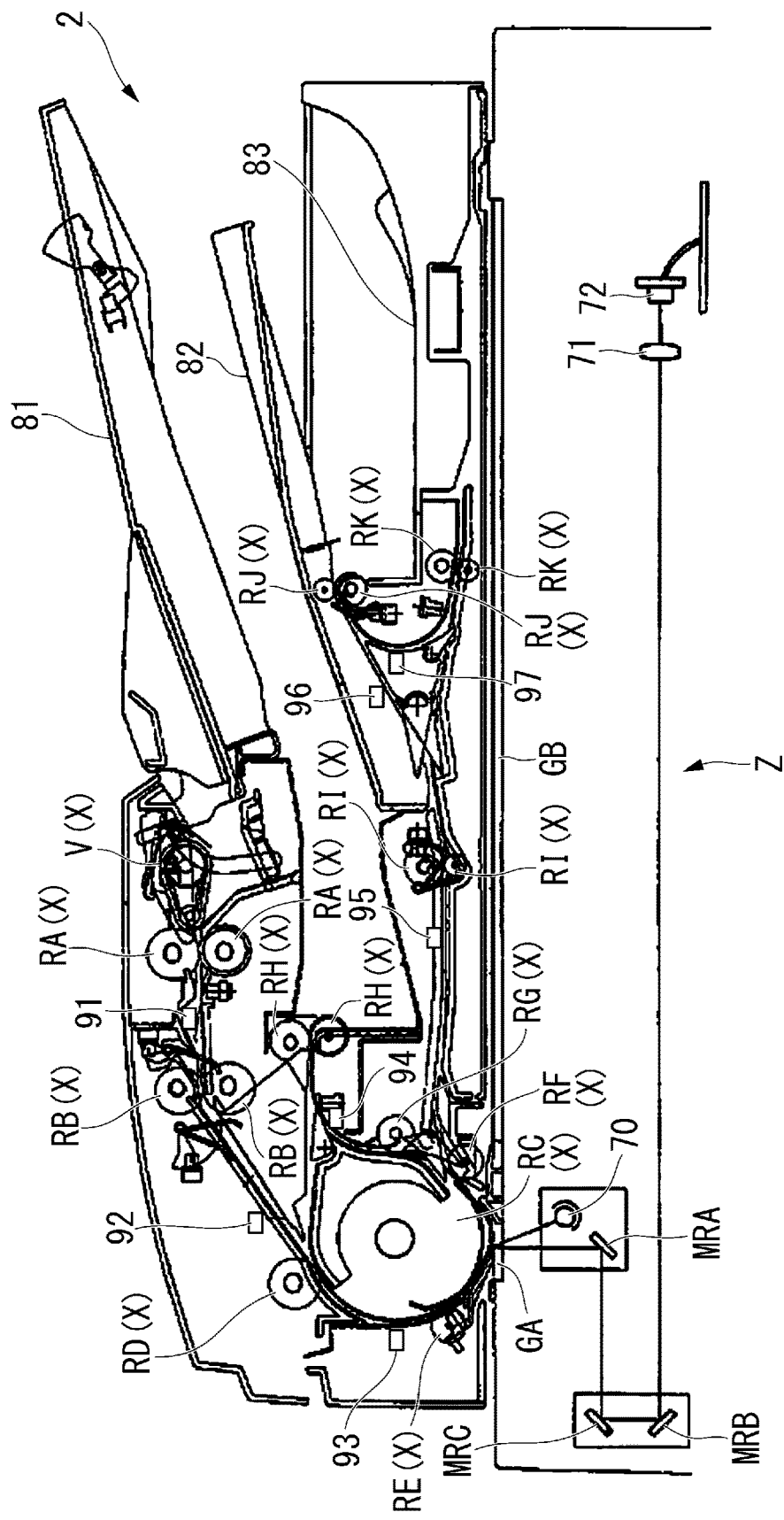
FIG. 7 is a diagram illustrating an example of a configuration of an image reading apparatus.

FIG. 7 is a diagram illustrating an example of a configuration of the image reading apparatus 2.

The image reading apparatus 2 is a scanner that reads image data representing an image formed on a medium such as a printing medium from the medium. In the example illustrated in FIG. 7, the image reading apparatus 2 may be a scanner attached to a multi-function peripheral, but the embodiment is not limited thereto. For example, a case where the image reading apparatus 2 is a scanner attached to the image forming apparatus 1 will be described. Here, the image reading apparatus 2 is controlled by the control unit 110 of the image forming apparatus 1. For convenience of description, the medium on which an image represented by the image data read by the image reading apparatus 2 is formed will be referred to as a reading medium. The reading medium is a sheet-like medium such as a printing medium, a book, a leaflet, or a document on which an image is formed, but the embodiment is not limited thereto.

The image reading apparatus 2 includes a contact glass GA, a light source 70, a mirror MRA, a mirror MRB, a mirror MRC, a lens 71, and a reading unit 72.

In the image reading apparatus 2, the reading medium is conveyed by various rollers such that the reading medium passes an upper surface of the contact glass GA. The image reading apparatus 2 irradiates the conveyed reading medium with light from the light source 70 such as a lamp through the contact glass GA. In the image reading apparatus 2, the light reflected from the reading medium is reflected by the mirror MRA, the mirror MRB, and the mirror MRC and heads to the lens 71. In the image reading apparatus 2, the reflected light headed to the lens 71 is converted into an electric signal by the reading unit 72 such as a charge coupled device (CCD) via the lens 71. As a result, the image reading apparatus 2 can read image data representing an image formed on the reading medium from the reading medium.

The image reading apparatus 2 further includes a contact glass GB having an area where the reading medium can be placed. The image reading apparatus 2 moves a light source unit configured by the light source 70, the mirror MRA, the mirror MRB, the mirror MRC, and the like in a sub-scanning direction with respect to the reading medium placed on the contact glass GB. Accordingly, the image reading apparatus 2 can also read image data representing an image of the reading medium through the contact glass GB.

The image reading apparatus 2 includes: a paper feed tray 81 on which plural sheets of the reading medium can be placed; and a paper discharge tray 82 and a paper discharge tray 83 to which the reading medium is discharged after the image data is read. The paper discharge tray 82 mainly accommodates a reading medium of a large size. The paper discharge tray 83 mainly accommodates a reading medium of a small size.

The image reading apparatus 2 includes a feed belt V, two paper feed rollers RA, two registration rollers RB, a conveying roller RC, a driven roller RD, a driven roller RE, a driven roller RF, and a driven roller RG. The image reading apparatus 2 further includes two paper discharge rollers RH, two intermediate rollers RI, two paper discharge rollers RJ, and two switch-back rollers RK. In the image reading apparatus 2, the reading medium is conveyed along a predetermined reading conveyance path by the above rollers.

The feed belt V feeds the reading medium placed on the paper feed tray 81 one by one, and conveys the fed reading medium to a gap between the two paper feed rollers RA.

The two paper feed rollers RA convey the reading medium fed by the feed belt V to a gap between the two registration rollers RB.

The conveying roller RC is a roller having a large diameter, and each of the driven roller RD, the driven roller RE, the driven roller RF, and the driven roller RG is disposed around the conveying roller RC to rotate together along the rotation of the conveying roller RC. The driven roller RD, the driven roller RE, the driven roller RF, and the driven roller RG are disposed in this order from the upstream side to the downstream side of the reading conveyance path. Among sections in the reading conveyance path, in a section between the driven roller RE and the driven roller RF, the reading medium passes the upper surface of the contact glass GA.

The reading medium that is conveyed by the conveying roller RC and the driven roller RG is discharged to the paper discharge tray 82 by the two paper discharge rollers RH.

The reading medium that is conveyed by the conveying roller RC and the driven roller RF is discharged to a gap between the two paper discharge rollers RJ by the two intermediate rollers RI.

The reading medium that is conveyed by the two intermediate rollers RI is discharged to the paper discharge tray 83 by the two paper discharge rollers RJ.

The two switch-back rollers RK switches back the reading medium and conveys the reading medium to the gap between the two paper discharge rollers RJ.

In the image reading apparatus 2, the plurality of rollers described above configure a conveying unit X that conveys the reading medium.

The image reading apparatus 2 includes a switching unit configured to switch the discharge destination of the reading medium to any one of the paper discharge tray 82 or the paper discharge tray 83. In the embodiment, the description of the switching unit will be omitted.

In the image reading apparatus 2, the members relating to the reading of the image data from the reading medium, for example, the light source 70, the mirror MRA, the mirror MRB, the mirror MRC, the lens 71, the reading unit 72, the contact glass GA, and the contact glass GB configure an image reading unit Z.

The image reading apparatus 2 further includes seven detection units including a detection unit 91 to a detection unit 97.

The detection unit 91 is a sensor that detects passage of the printing medium through a sixth detection position that is positioned between the two paper feed rollers RA and the two registration rollers RB among positions on the reading conveyance path along which the printing medium is conveyed by the conveying unit X.

The detection unit 92 is a sensor that detects passage of the printing medium through a seventh detection position that is positioned between the two registration rollers RB and the driven roller RD among the positions on the reading conveyance path along which the printing medium is conveyed by the conveying unit X.

The detection unit 93 is a sensor that detects passage of the printing medium through an eighth detection position that is positioned between the driven roller RD and the driven roller RE among the positions on the reading conveyance path along which the printing medium is conveyed by the conveying unit X.

The detection unit 94 is a sensor that detects passage of the printing medium through a ninth detection position that is positioned between the driven roller RG and the two paper discharge rollers RH among the positions on the reading conveyance path along which the printing medium is conveyed by the conveying unit X.

The detection unit 95 is a sensor that detects passage of the printing medium through a tenth detection position that is positioned between the driven roller RF and the two intermediate rollers RI among the positions on the reading conveyance path along which the printing medium is conveyed by the conveying unit X.

The detection unit 96 is a sensor that detects passage of the printing medium through an eleventh detection position that is positioned between the two intermediate rollers RI and the two paper discharge rollers RJ among the positions on the reading conveyance path along which the printing medium is conveyed by the conveying unit X.

The detection unit 97 is a sensor that detects passage of the printing medium through a twelfth detection position that is positioned between the two switch-back rollers RK and the two paper discharge rollers RJ among the positions on the reading conveyance path along which the printing medium is conveyed by the conveying unit X.

In the image reading apparatus 2 having the above-described configuration, the control unit 110 executes a deterioration determination process of determining whether each of the rollers in the conveying unit X is deteriorated according to a received operation.

In the deterioration determination process relating to the image reading apparatus 2, the control unit 110 uses, for example, a combination of two detection units among the seven detection units 91 to 97. That is, the control unit 110 uses a detection unit that is positioned on the upstream side among the two detection units as a first detection unit, and uses a detection unit that is positioned on the downstream side among the two detection units as a second detection unit. Accordingly, the image reading apparatus 2 can determine whether each of the rollers in the conveying unit X is deteriorated based on a first timing at which the reading medium is detected by the first detection unit and a second timing at which the reading medium is detected by the second detection unit. As a result, the image reading apparatus 2 can replace each of the rollers at an appropriate timing. That is, the image reading apparatus 2 can prevent the occurrence of malfunction during conveyance of the reading medium.

The image reading apparatus 2 may be configured to be controlled by another control device instead of the control unit 110. That is, the image reading apparatus 2 may execute the deterioration determination process using the other control device instead of the control unit 110. The other control device may be a device equipped in the image reading apparatus 2 or may be a device that is communicatively connected to the image reading apparatus 2 from the outside.

The deterioration determination process described above may be executed in another image processing apparatus that executes various image processing on a desired medium. The features described above may be combined in various ways.

As described above, the image forming apparatus (in the example described above, the image forming apparatus 1) includes a conveying unit (in the example described above, the conveying unit H), an image forming unit (in the example described above, the photoconductive drum 41, the transfer roller 45, and the like), a first detection unit (in the example described above, for example, the detection unit 62), a second detection unit (in the example described above, for example, the detection unit 61), and a control unit (in the example described above, the control unit 110). The conveying unit includes a conveying member (in the example described above, each of the rollers included in the conveying unit H) configured to convey a printing medium along a predetermined conveyance path. The image forming unit forms an image on the printing medium. The first detection unit detects passage of the printing medium through a first position (in the example described above, for example, the second detection position) on the conveyance path. The second detection unit detects passage of the printing medium through a second position (in the example described above, for example, the first detection position) that is provided downstream of the first position on the conveyance path. The control unit controls the conveying unit and the image forming unit. If the control unit determines whether the conveying member is deteriorated, the control unit controls the conveying unit such that the printing medium is conveyed at a second conveying speed slower than a first conveying speed, the first conveying speed being a speed at which the printing medium is conveyed if the control unit does not determine whether the conveying member is deteriorated, and determines whether the conveying member is deteriorated based on a first timing at which the printing medium is detected by the first detection unit and a second timing at which the printing medium is detected by the second detection unit. Accordingly, the image forming apparatus can prevent the occurrence of malfunction during conveyance of the printing medium.

In the image forming apparatus, if the control unit determines whether the conveying member is deteriorated and if a difference between the first timing and the second timing (in the example described above, the target time difference) is more than or equal to a first threshold, the control unit may cause a display unit (in the example described above, the display unit of the control panel 12) to display information representing that the conveying member is deteriorated.

In the image forming apparatus, if the control unit determines whether the conveying member is deteriorated and if the difference between the first timing and the second timing is more than or equal to the first threshold, the control unit may cause a sound output unit to output a sound representing that the conveying member is deteriorated.

In the image forming apparatus, if the control unit determines whether the conveying member is deteriorated and if the difference between the first timing and the second timing is more than or equal to the first threshold, the control unit may output information for notifying that the conveying member deteriorated is to an information processing apparatus that is communicatively connected to the image forming apparatus.

In the image forming apparatus, if the control unit determines whether the conveying member is deteriorated, if the difference between the first timing and the second timing is more than or equal to a second threshold that is shorter than the first threshold, and if the difference is less than the first threshold, the control unit may increase the first conveying speed.

In the image forming apparatus, the conveying member may include a paper feed roller (in the example described above, the second paper feed rollers 32) configured to feed the printing medium from an a accommodation unit that accommodates the printing medium and a registration roller (in the example described above, the registration roller 34) configured to convey the printing medium fed by the paper feed roller to the image forming unit, the first position may be a position that is positioned downstream of the paper feed roller on the conveyance path, and the second position may be a position that is positioned upstream of the registration roller on the conveyance path.

In the image forming apparatus, if the control unit determines whether the conveying member is deteriorated, the control unit may control the image forming unit to not form an image on the printing medium.

In the image forming apparatus, the control unit may change the second conveying speed depending on a thickness of the printing medium.

In the image forming apparatus, the control unit may determine whether the conveying member is deteriorated at at least one of a received timing or a predetermined timing.

An image processing apparatus (in the example described above, the image forming apparatus 1 or the image reading apparatus 2) includes a conveying unit, an image processing unit, a first detection unit, a second detection unit, and a control unit. The conveying unit (in the example described above, the conveying unit H or the conveying unit X) includes a conveying member (in the example described above, each of the rollers in the conveying unit H or each of the rollers in the conveying unit X) configured to convey a medium (in the example described above, the printing medium or the reading medium) along a predetermined conveyance path. The image processing unit (in the example described above, the photoconductive drum 41 and the transfer roller 45, the image reading unit Z, or the like) executes image processing (in the example described above, the formation of an image or the reading of image data) on the medium. The first detection unit (in the example described above, for example, the detection unit 91) detects passage of the medium through a first position on the conveyance path. The second detection unit (in the example described above, the detection unit 92) detects passage of the medium through a second position (in the example described above, the seventh detection position) that is provided downstream of the first position (in the example h described above, the sixth detection position) on the conveyance path. The control unit (in the example described above, the control unit 110) controls the conveying unit and the image processing unit. If the control unit determines whether the conveying member is deteriorated, the control unit controls the conveying unit such that the medium is conveyed at a second conveying speed slower than a first conveying speed, the first conveying speed being a speed at which the medium is conveyed if the control unit does not determine whether the conveying member is deteriorated, and determines whether the conveying member is deteriorated based on a first timing at which the medium is detected by the first detection unit and a second timing at which the medium is detected by the second detection unit. That is, the image processing apparatus can prevent the occurrence of malfunction during conveyance of the reading medium.

A program for implementing a function of any component in the apparatus described above (for example, the image forming apparatus 1 or the image reading apparatus 2) may be executed by recording the program in a computer-readable recording medium and reading the program to a computer system. The definition of "computer system" described herein includes an operating system (OS) and hardware such as a peripheral. "Computer-readable recording medium" refers to a storage device, for example, a portable medium such as a flexible disk, a magneto-optic disk, a ROM, or a compact disk (CD)-ROM or a hard disk built into a computer system. "Computer-readable recording medium" may also refer to a medium that stores a program for a certain period of time, for example, a volatile memory (RAM) in a computer system that functions as a server or a client if the program is transmitted via a network such as an Internet or a communication line such as a telephone line.

The program may be transmitted from a computer system that includes a storage device or the like storing the program to another computer system via a transmission medium or via a transmission wave in a transmission medium. "Transmission medium" that transmits the program refers to a medium having a function of transmitting information, for example, a network (communication network) such as an Internet or a communication line such as a telephone line.

The program may implement some of the above-described functions. The program may be a so-called difference file (difference program) that can implement the above-described function in combination with a program that is recorded in advance in a computer system.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image forming apparatus comprising:
    a conveyor including a conveying member configured to convey a printing medium along a predetermined conveyance path;
    an image forming unit configured to form an image on the printing medium;
    a first detector configured to detect passage of the printing medium through a first position on the conveyance path;
    a second detector configured to detect passage of the printing medium through a second position positioned downstream of the first position on the conveyance path; and
    a controller configured to: control the conveyor and the image forming unit, wherein
    when the controller
    determines that the conveying member is deteriorated, the controller controls the conveyor such that the printing medium is conveyed at a second conveying speed slower than a first conveying speed, the first conveying speed being a speed at which the printing medium is conveyed when the controller does not determine that the conveying member is deteriorated, and the controller determines whether the conveying member is deteriorated based on a first timing at which the printing medium is detected by the first detector and a second timing at which the printing medium is detected by the second detector.

2. The apparatus according to claim 1, wherein
    when the controller is configured to determine whether the conveying member is deteriorated and when a difference between the first timing and the second timing is more than or equal to a first threshold, the controller causes a display to display information representing that the conveying member is deteriorated.

3. The apparatus according to claim 2, wherein
    when the controller determines whether the conveying member is deteriorated and when the difference is more than or equal to the first threshold, the controller causes a sound output to output a sound representing that the conveying member is deteriorated.

4. The apparatus according to claim 2, wherein
    when the controller determines whether the conveying member is deteriorated and when the difference between the first timing and the second timing is more than or equal to the first threshold, the controller outputs information for notifying that the conveying member is deteriorated to an information processing apparatus that is communicatively connected to the image forming apparatus.

5. The apparatus according to claim 2, wherein
    when the controller determines that the conveying member is deteriorated, when the difference is more than or equal to a second threshold that is shorter than the first threshold, and when the difference is less than the first threshold, the controller increases the first conveying speed.

6. The apparatus according to claim 1, wherein
    the conveying member includes a paper feed roller configured to feed the printing medium from an accommodation unit configured to accommodate the printing medium and a registration roller configured to convey the printing medium fed by the paper feed roller to the image forming unit,
    the first position is a position positioned downstream of the paper feed roller on the conveyance path, and
    the second position is a position positioned upstream of the registration roller on the conveyance path.

7. The apparatus according to claim 1, wherein
    when the controller determines whether the conveying member is deteriorated, the controller controls the image forming unit to not form an image on the printing medium.

8. The apparatus according to claim 1, wherein
the controller is configured to change the second conveying speed depending on a thickness of the printing medium.

9. The apparatus according to claim 1, wherein
the controller is configured to determine whether the conveying member is deteriorated at at least one of a received timing or a predetermined timing.

10. An image processing apparatus comprising:
a conveyor including a conveying member configured to convey a medium along a predetermined conveyance path;
an image processing unit configured to execute image processing on the medium;
a first detector configured to detect passage of the medium through a first position on the conveyance path;
a second detector configured to detect passage of the medium through a second position positioned downstream of the first position on the conveyance path; and
a controller configured to control the conveyor and the image processing unit, wherein
when the controller determines whether the conveying member is deteriorated, the controller controls the conveyor such that the medium is conveyed at a second conveying speed slower than a first conveying speed, the first conveying speed being a speed at which the medium is conveyed when the controller does not determine whether the conveyor is deteriorated, and the controller determines whether the conveying member is deteriorated based on a first timing at which the medium is detected by the first detector and a second timing at which the medium is detected by the second detector.

11. A method of operating an image forming apparatus comprising:
detecting, via a first detector, passage of a printing medium through a first position on a conveyance path of a conveyor;
detecting, via a second detector, passage of the printing medium through a second position positioned downstream of the first position on the conveyance path;
controlling the conveyor and an image forming unit;
determining whether a conveying member of the conveyor is deteriorated;
controlling the conveyor such that the printing medium is conveyed at a second conveying speed slower than a first conveying speed, the first conveying speed being a speed at which the printing medium is conveyed when it is not determined whether the conveying member is deteriorated;
determining whether the conveying member is deteriorated based on a first timing at which the printing medium is detected by the first detector and a second timing at which the printing medium is detected by the second detector.

12. The method according to claim 11, further comprising determining whether the conveying member is deteriorated and when a difference between the first timing and the second timing is more than or equal to a first threshold, causing a display to display information representing that the conveying member is deteriorated.

13. The method according to claim 12, further comprising determining whether the conveying member is deteriorated and when the difference is more than or equal to the first threshold, causing a sound output to output a sound representing that the conveying member is deteriorated.

14. The method according to claim 12, further comprising when it is determined whether the conveying member is deteriorated and when the difference between the first timing and the second timing is more than or equal to the first threshold, outputting information for notifying that the conveying member is deteriorated to an information processing apparatus that is communicatively connected to the image forming apparatus.

15. The method according to claim 12, wherein
when it is determined whether the conveying member is deteriorated, when the difference is more than or equal to a second threshold that is shorter than the first threshold, and when the difference is less than the first threshold, increasing the first conveying speed.

16. The method according to claim 11, wherein
the conveying member includes a paper feed roller configured to feed the printing medium from an accommodation unit configured to accommodate the printing medium and a registration roller configured to convey the printing medium fed by the paper feed roller to the image forming unit,
the first position is a position positioned downstream of the paper feed roller on the conveyance path, and
the second position is a position positioned upstream of the registration roller on the conveyance path.

* * * * *